Aug. 5, 1952     T. J. BOLAND     2,606,316
ELECTRONIC AMPLIFIER CIRCUITS
Filed Nov. 5, 1948

INVENTOR
THOMAS J. BOLAND
BY Elmer J. Gorn
ATTORNEY

Patented Aug. 5, 1952

2,606,316

UNITED STATES PATENT OFFICE 2,606,316

ELECTRONIC AMPLIFIER CIRCUITS

Thomas J. Boland, Wakefield, Mass., assignor to Raytheon Manufacturing Company, a corporation of Delaware Application November 5, 1948, Serial No. 58,460

11 Claims. (Cl. 343—5)

This invention relates in general to tuned electronic amplifier circuits having variable band width, and more particularly to methods and means for varying the band width of such circuits.

It is an object of the invention to provide improved means for controlling and varying the band width of a tuned electronic amplifier.

It is another object to devise such means which will also provide control of the gain of the amplifier.

It is an additional object of the invention to devise band width control means which are particularly suitable for use in echo distance determining systems, such as underwater sounding and ranging systems, for example.

It is a further object of the invention to devise such control means which can be operated from the now available A. V. C. voltage sources in radio receivers and the like.

Other and further objects of the invention will become apparent from the description of certain embodiments thereof which follows, reference being had to the accompanying drawings, wherein.

Figure 1:
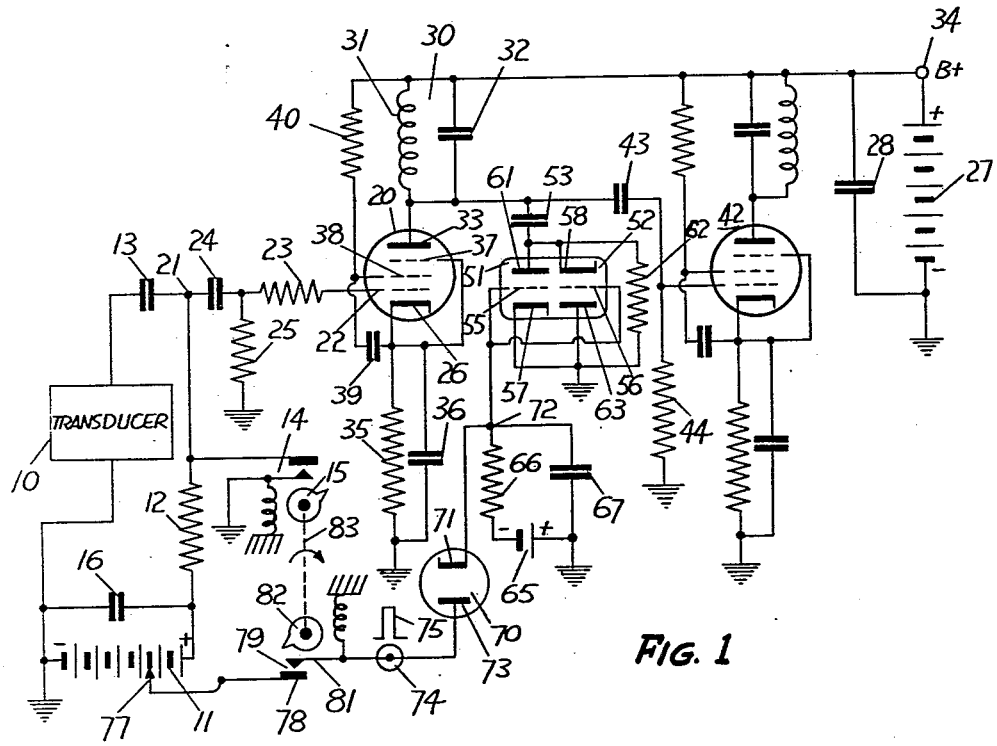
Fig. 1 is an electrical schematic of the invention as it may be employed in an underwater echo distance determining system.

Referring now to Fig. 1, a transducer 10 is shown in the form of a block, representative of any of the known forms of underwater sound transducers. A source of unidirectional power which may be a battery 11, a resistor 12, a capacitor 13, and the transducer 10 are connected together in a series circuit, whereby the capacitor 13 may be charged to the battery potential through the transducer 10. A normally open switch 14, operated momentarily to a closed position by a rotatable cam 15, provides a momentary short circuit around the battery 11 and resistor 12. The capacitor 13 discharges via this short circuit through the transducer 10, thereby shock-exciting the transducer into oscillation at its natural frequency. A second capacitor 16 is connected in shunt with the battery 11, and provides a bypass around the battery for the transducer oscillations when the switch 14 is opened.

The first tube 20 of the receiver amplifier of the system is coupled via its control grid 22 to the junction point 21 of the resistor 12 and capacitor 13 through a current-limiting resistor 23 and a coupling capacitor 24 in series. A grid coupling resistor 25 is connected at one side to the junction of the current-limiting resistor 23 and the coupling capacitor 24, and at the other side to ground.

The details of construction and operation of the circuit arrangements just described are set forth and claimed in copending application, Serial No. 27,210, filed May 15, 1948, of Fryklund, now Patent No. 2,561,851, dated July 24, 1951. The operation, briefly, is as follows. When the switch 14 is closed, point 21 is connected to ground, thereby short-circuiting the input to tube 20 at the same time that the transducer 10 is excited. This arrangement provides protection for the receiver and the indicator that is used therewith during the production of a transmitted pulse. It has been found, however, that the sudden change of potential on the grid 22 with respect to the cathode 26 of the first tube 20 causes the production of sharp transients in the tuned circuits of the amplifier, and, particularly when the amplifier is sharply tuned, these tuned circuits become shock-excited, or ring in the same manner as the transducer 10. The present invention has as one of its features the elimination of such ringing and a consequent increase in the useful range of the sounding or ranging system.

The circuit of the first tube 20 includes a tuned circuit 30, comprising an inductor 31 and a capacitor 32 connected in parallel between the anode 33 and the positive terminal of a battery 27 via a common B+ terminal 34. The negative terminal of the battery 27 is grounded, and a bypass capacitor 28 is connected in shunt with the battery. The cathode 26 of the tube is connected to ground via a biasing resistor 35 and a shunt connected bypass capacitor 36. The suppressor grid 37 is directly connected to the cathode, while the screen grid 38 is connected to the cathode via a bypass capacitor 39. The screen grid derives its potential from the B+ terminal 34 through a dropping resistor 40. The tube 20 is preferably a sharp cut-off pentode, for example a type 6AU6. The output of the first tube 20 is coupled to a second similar amplifying stage 42 through a coupling capacitor 43 and a coupling resistor 44. As will be appreciated by those skilled in the art, a particular receiver may involve any desired number of tuned amplifying stages, and these stages may be sharply tuned to the same frequency or sharply tuned each to a slightly different frequency, the latter arrangement being known as stagger tuning.

A pair of reversely-connected triodes 51 and 52 are connected in shunt with the tuned circuit 30 through a capacitor 53. Considering the tuned circuit 30 as the source of the alternating signal which is being amplified, the shunt path around it consists of the capacitor 53, the parallel-connected triodes 51 and 52, and the battery bypass condenser 28 in series, the circuit of the shunt path being completed through suitable ground connections as shown. The capacitors 53 and 28 are of sufficiently large size with respect to the frequency of the signals being handled so that their reactance is low at the operating frequency, and the shunt path is essentially a resistance. The magnitude of the resistance is controlled by the potential which is furnished to the grids 55 and 56 of triodes 51 and 52, respectively, with respect to their respective cathodes 57 and 58. The anode 61 of the first triode 51 is directly connected to the cathode 58 of the second triode 52, and these two elements are then connected through a relatively large resistor 62, having a value of a megohm or more, to ground. The anode 63 of the second triode 52 and the cathode 57 of the first triode 51 are also both connected to ground. A permanent cut-off bias is furnished to the grids 55 and 56 by a bias battery 65, which has its positive terminal grounded and its negative terminal connected to both grids in parallel through a discharge resistor 66. A charging capacitor 67 is connected in shunt with the battery 65 and the resistor 66 in series. A diode 70 has its cathode 71 connected to the junction point 72 of the resistor 66, capacitor 67, and the grids 55 and 56, and its anode 73 connected to a terminal 74 at which positive pulses 75 synchronized with transmitted pulses are made available in a manner that will presently be described. The positive pulse passes through the diode 70 and places a charge on the charging capacitor 67 which overcomes the bias of the bias battery 65 and renders the triodes 51 and 52 conductive each during one of the half-cycles of the signal wave. The charge on the charging capacitor 67 leaks off through the discharge resistor 66 so that the triodes 51 and 52 are, within a fixed time interval, again rendered non-conductive. The large resistor 62 provides a direct current return around the triodes 51 and 52.

The pulse 75 is derived from the battery 11 which provides the energy from which the transducer pulse is derived. A voltage selection tap 77 is connected to one terminal 78 of a normally open switch 79. The other terminal 81 of this switch is connected to the pulse terminal 74. A rotatable cam 82 momentarily closes the switch 79 at the same time that the first-mentioned cam 15 momentarily closes the transducer keying switch 14. For this purpose, the two cams 15 and 82 can be arranged on the same operating shaft 83. When the pulse switch 79 is closed, a circuit is completed from the tap 77 through the switch 79 and terminal 74 to the anode 73 of the diode 70, then from the cathode 71 through the charging capacitor 67 to ground, and via ground to the negative terminal of the transducer battery 11. This connection is such that the diode 70 becomes conductive and the burst of current that flows therethrough when the switch 79 is momentarily closed constitutes the short pulse 75.

The operation of the invention is as follows. When the transducer 10 is operated to produce a pulse of transmitted energy, the control pulse 75 charges the charging capacitor 67, thereby rendering the triodes 51 and 52 conductive. The impedance of the shunt path across the tuned circuit 30 is lowered. The effect of this is to increase the band width of the tuned circuit and simultaneously to lower the gain of the amplifier stage in which it is included. From another point of view it may be said that the tuned amplifier stage is in fact detuned, or rendered aperiodic. As such, the amplifier stage is not now easily shock-excited, either by transients due to the energization of the transducer or by transients due to spurious signals and disturbances originating at close ranges. It is common experience that spurious transients originating by nearby sources seriously disturb tuned amplifiers. Depending upon the time constant of the parallel circuit of the charging capacitor 67 and the discharge resistor 66, the conductivity of the triodes 51 and 52 will eventually fall to zero, and these tubes again become non-conductive. At this time the shunt path around the tuned circuit has such a high resistance that it constitutes practically an open circuit. Under this condition, the sharp tuning of the amplifier stage is restored, and signals of the operating frequency are amplified to a high degree. Only echoes from distant objects will be returning at this time, and it is desired to have maximum gain available to amplify such echoes. Thus, when the present invention is incorporated in a depth sounding equipment, for example, the gain and susceptibility to disturbance are reduced automatically when shoal soundings are being taken and increased automatically for deep soundings.

A further advantage of the invention is that when the band width is increased, the response time of the amplifier correspondingly increases. Thus, in a depth sounding system the present invention makes possible shoal sounding in very shallow water by providing fast response of the kind available with aperiodic amplifiers, while also providing the advantages of a tuned amplifier having higher gain and higher sensitivity for deep sounding.

Figure 2:
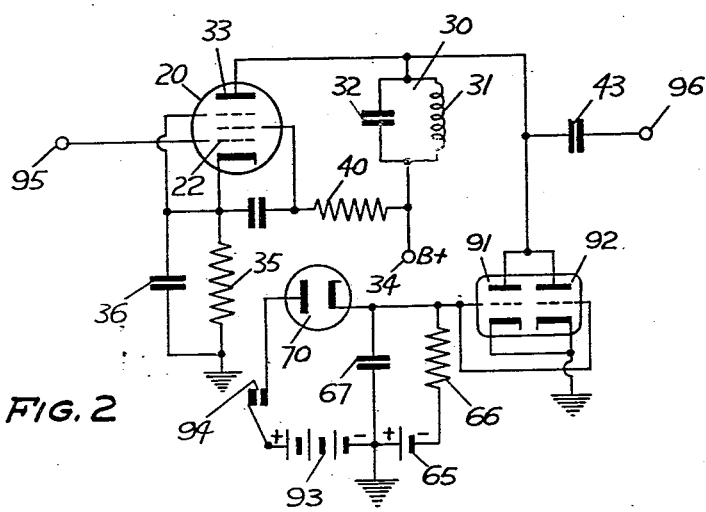
Fig. 2 is a simplified electrical schematic of another embodiment of the invention.

The connection of the tube triodes 51 and 52 in Fig. 1 is such that these tubes are operative on both halves of the cycle of the alternating current wave. Fig. 2 illustrates another embodiment, wherein the blocking capacitor 53 and the direct current return resistor 62 are eliminated, and the variable shunt across the tuned circuit 30 is purely resistive. In this other embodiment, two triodes 91 and 92 are connected in parallel and in the same direction across the tuned circuit 30. The return of the circuit through the capacitance 28 of the battery 27 is not illustrated as it is the same as in Fig. 1. The positive pulse 75 is again furnished to the charging capacitor 67 from a battery 93 under the control of a normally open momentarily operated switch 94 through the diode 70. The battery 93 and switch 94 are the equivalent of the section of the transducer battery 11 that is tapped by the tap 77 in Fig. 1 and the cam-operated switch 79. The signal is brought to the grid 22 of the first tube 20 by way of an input terminal 95 and taken from the first stage to the succeeding stage by way of an output terminal 96 following the signal coupling capacitor 43. In all other respects the circuit of Fig. 2 is the same as the circuit of Fig. 1. Two triodes 91 and 92 are shown, since it will be convenient to employ a double triode tube, namely, a tube wherein the elements of both triodes are contained in the same envelope, and to arrange the external connections in the manner desired.

The embodiment of the invention illustrated in Fig. 2 operates in the same manner as that illustrated in Fig. 1 with the additional improvement that a purely resistive shunt is provided across the tuned circuit 30. On the other hand, the arrangement of the triodes 91 and 92 is such that the shunt is provided only during those half-cycles of the signal wave when the anodes are positive with respect to the cathodes. Both embodiments are operative, however, to produce the desired results.

Figure 3:
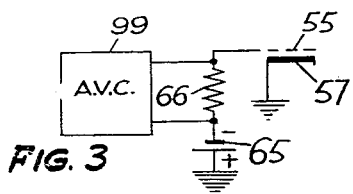
Fig. 3 illustrates the invention as it may be employed in a radio receiver.

Referring now to Fig. 3, which illustrates the invention as it may be employed in a radio receiver, the shunt circuit around the tuned circuit 30 is controlled by the voltage furnished from the A. V. C. system 99, commonly found in the receiver. The voltage from the A. V. C. system is applied directly across the resistor 66 in the biasing circuit of the shunt tubes, of which only one cathode 57 and one control grid 55 are illustrated in Fig. 3. The bias battery 65 may be retained if desired.

The invention is conveniently employed in connection with the intermediate frequency amplifier of the receiver and controls the band width of this amplifier, and hence of the receiver. The A. V. C. voltage connection is such that on strong local signals the band width is increased, permitting response to a wider band of audio-frequencies. To accomplish this, the A. V. C. voltage should be applied to increase the conductivity of the shunt circuit on strong local signals. Then, for distant or weaker stations, the resistance of the shunt circuit is increased, and the selectivity and sensitivity of the receiver are increased therewith.

Many other variations and equivalents of the invention will occur to those skilled in the art, and it is accordingly intended that the claims that follow shall not be limited by the details of the embodiments that are shown and described herein, but only by the prior art.

What is claimed is:

1. In combination, in an echo distance measuring system having search pulse producing means and echo pulse receiving means operative at a prescribed frequency, an electronic amplifier in circuit with said receiving means, said amplifier including a parallel-resonance circuit tuned substantially to said prescribed frequency across which amplified received signals are developed, circuit means connected in shunt with said parallel-resonance circuit, means coupled with said search pulse producing means for reducing the resistance of said shunt-connected means each time a search pulse is produced, and means operative thereafter for gradually increasing said resistance at a controlled rate.

2. In combination, in an echo distance measuring system having search pulse producing means and echo pulse receiving means operative at a prescribed frequency, an electronic amplifier in circuit with said receiving means, said amplifier including a parallel-resonance circuit tuned substantially to said prescribed frequency across which amplified received signals are developed, electron tube means having an anode-cathode path connected in shunt with said parallel-resonance circuit, means coupled in operation with said search pulse producing means for increasing the conductivity of said electron tube means each time a search pulse is produced, and means operative thereafter for gradually decreasing said conductivity at a controlled rate.

3. In combination, in an echo distance measuring system having search pulse producing means and echo pulse receiving means operative at a prescribed frequency, an electronic amplifier in circuit with said receiving means, said amplifier including a parallel-resonance circuit tuned substantially to said prescribed frequency across which amplified received signals are developed, electron tube means having an anode-cathode path connected in shunt with said parallel-resonance circuit, means normally providing a cut-off bias potential to said electron tube means, means coupled with said search pulse producing means rendering said electron tube means conductive each time a search pulse is produced, and means operative thereafter for gradually decreasing the conductivity of said electron tube means to the cut-off point at a controlled rate.

4. In combination, in an echo distance measuring system having search pulse producing means and echo pulse receiving means operative at a prescribed frequency, an electronic amplifier in circuit with said receiving means, said amplifier including a parallel-resonance circuit tuned substantially to said prescribed frequency across which amplified received signals are developed, electron tube means having an anode-cathode path connected in shunt with said parallel-resonance circuit, means normally providing a cut-off bias potential to said electron tube means, means coupled with said search pulse producing means for providing a second potential in opposition to said bias potential to render said electron tube means conductive, and means operative thereafter to gradually reduce said second potential in magnitude at a controlled rate.

5. In combination, in an echo distance measuring system having search pulse producing means and echo pulse receiving means operative at a prescribed frequency, an electronic amplifier in circuit with said receiving means, said amplifier including a parallel-resonance circuit tuned substantially to said prescribed frequency across which amplified received signals are developed, electron tube means having an anode-cathode path connected in shunt with said parallel-resonance circuit, means normally providing a cut-off bias potential to said electron tube means, a source of second potential, switch means momentarily operated in synchronism with said search pulse producing means for connecting said source to said electron tube means in opposition to said bias potential to render said electron tube means conductive.

6. In combination, in an echo distance measuring system having search pulse producing means and echo pulse receiving means operative at a prescribed frequency, an electronic amplifier in circuit with said receiving means, said amplifier including a parallel-resonance circuit tuned substantially to said prescribed frequency across which amplified received signals are developed, electron tube means having an anode-cathode path connected in shunt with said parallel-resonance circuit, means normally providing a cut-off bias potential to said electron tube means, a source of second potential, switch means momentarily operated in synchronism with said search pulse producing means for connecting said source to said electron tube means in opposition to said bias potential to render said electron tube means conductive, charge storing means connected in parallel with said bias pro- 7. In combination, in an echo distance measuring system having search pulse producing means and echo pulse receiving means operative at a prescribed frequency, an electronic amplifier in circuit with said receiving means, said amplifier including a parallel-resonance circuit tuned substantially to said prescribed frequency across which amplified received signals are developed, electron tube means having an anode, a cathode, and a control grid, with its anode-cathode path connected in shunt with said parallel-resonance circuit, a capacitor and a resistor connected in parallel between said cathode and said control grid, and means coupled in operation with said search pulse producing means for momentarily charging said capacitor in the direction tending to increase the conductivity of said electron tube means each time a search pulse is produced, said resistor being dimensioned to discharge said capacitor at a controlled rate.

8. In combination, in an echo distance measuring system having search pulse producing means and echo pulse receiving means operative at a prescribed frequency, an electronic amplifier in circuit with said receiving means, said amplifier including a parallel-resonance circuit tuned substantially to said prescribed frequency across which amplified received signals are developed, circuit means connected in shunt with said parallel-resonance circuit, means to produce a voltage pulse in synchronism with a search pulse, means employing said voltage pulse to reduce the resistance of said shunt-connected means when a search pulse is produced, and means operative thereafter for gradually increasing said resistance at a controlled rate.

9. In combination, in an echo distance measuring system having search pulse producing means and echo pulse receiving means operative at a prescribed frequency, an electronic amplifier in circuit with said receiving means, said amplifier including a parallel-resonance circuit tuned substantially to said prescribed frequency across which amplified received signals are developed, electron tube means having an anode-cathode path connected in shunt with said parallel-resonance circuit, means to produce a voltage pulse in synchronism with a search pulse, means employing said voltage pulse to increase the conductivity of said electron tube means when a search pulse is produced, and means operative thereafter for gradually decreasing said conductivity at a controlled rate.

10. In combination, in an echo distance measuring system having search pulse producing means and echo pulse receiving means operative at a prescribed frequency, an electronic amplifier in circuit with said receiving means, said amplifier including a parallel-resonance circuit tuned substantially to said prescribed frequency across which amplified received signals are developed, a rectifier connected in shunt with said parallel-resonance circuit, means coupled with said search pulse producing means for reducing the resistance of said shunt-connected rectifier each time a search pulse is produced, and means operative thereafter for gradually increasing said resistance at a controlled rate.

11. In combination, in an echo distance measuring system having search pulse producing means and echo pulse receiving means operative at a prescribed frequency, an electronic amplifier in circuit with said receiving means, said amplifier including a parallel-resonance circuit tuned substantially to said prescribed frequency across which amplified received signals are developed, a rectifier connected in shunt with said parallel-resonance circuit, means to produce a voltage pulse in synchronism with a search pulse, means employing said voltage pulse to reduce the resistance of said shunt-connected rectifier when a search pulse is produced, and means operative thereafter for gradually increasing said resistance at a controlled rate.

THOMAS J. BOLAND.

REFERENCES CITED

The following references are of record in the file of this patent:

UNITED STATES PATENTS

| Number | Name | Date |
|---|---|---|
| 1,687,061 | De Bellescize | Oct. 9, 1928 |
| 2,167,492 | Sproule | July 25, 1939 |
| 2,181,309 | Andriew | Nov. 28, 1939 |
| 2,273,193 | Heising | Feb. 17, 1942 |
| 2,397,842 | Crosby | Apr. 2, 1946 |
| 2,416,308 | Grieg | Feb. 25, 1947 |
| 2,422,334 | Bedford | June 17, 1947 |
| 2,435,960 | Fyler | Feb. 17, 1948 |
| 2,440,278 | Labin | Apr. 27, 1948 |
| 2,444,455 | Labin | July 16, 1948 |
| 2,449,985 | Gloess | Sept. 28, 1948 |
| 2,456,952 | Kluender | Dec. 21, 1948 |
| 2,498,381 | Smith | Feb. 21, 1950 |
| 2,507,176 | Posthumus | May 9, 1950 |